United States Patent [19]

Celi, Jr.

[11] Patent Number: 5,261,079
[45] Date of Patent: Nov. 9, 1993

[54] INTERFACE FOR KEYBOARD EMULATION PROVIDED BY AN OPERATING SYSTEM

[75] Inventor: Joseph Celi, Jr., Boynton Beach, Fla.

[73] Assignee: International Business Machines Corporation, Armonk, N.Y.

[21] Appl. No.: 629,505

[22] Filed: Dec. 18, 1990

[51] Int. Cl.⁵ .............................................. G06F 3/02
[52] U.S. Cl. ............................ 395/500; 364/DIG. 2; 364/927.81; 364/928
[58] Field of Search .................. 364/DIG. 1 MS File, 364/DIG. 2 MS File; 395/500, 700, 800

[56]  References Cited
U.S. PATENT DOCUMENTS

| | | | |
|---|---|---|---|
| 4,562,304 | 12/1985 | Ward et al. | 178/18 |
| 4,920,481 | 4/1990 | Binkley et al. | 364/DIG. 1 |
| 4,937,036 | 6/1990 | Beard et al. | 364/DIG. 1 |
| 4,939,507 | 7/1990 | Beard et al. | 364/DIG. 2 |
| 5,034,598 | 7/1991 | Poland | 235/435 |
| 5,113,517 | 5/1992 | Beard et al. | 364/DIG. 1 |

Primary Examiner—Robert B. Harrell
Attorney, Agent, or Firm—Bruce D. Jobse; Anibal Jose Cortina

[57] ABSTRACT

A computer system includes a keyboard which includes cooperatively operating therewith a keyboard device driver to enable the keyboard to interface with an operating system and applications program running within the computer system. Further types of input devices, such as handprint terminals, light pens, etc., can be employed in place of a keyboard to interact with the operating system and application programs running within the computer system. A keyboard device driver emulator is provided which transforms input data from the alternate input device so as to have said data appear to be keyboard generated data which is then transmitted to the operating system and applications running within the computer system. The invention also relates to a method of operating a computer system with an input device which is not a keyboard, but operating the system as if the input device were a keyboard by transforming the data from the input device to make it appear to be keyboard generated data.

14 Claims, 5 Drawing Sheets

INTERFACE FOR KEYBOARD EMULATION PROVIDED BY AN OPERATING SYSTEM

FIELD OF THE INVENTION

This invention relates to an interface, within a personal computer operating system, that provides a means for keyboard emulation. Keyboard emulation, as defined herein, is the ability to send raw keyboard like data into the operating system for further processing without the need for a physical keyboard device to be attached to the system. The keyboard data will eventually be transmitted to application programs running on the computer as if the data originated from a keyboard device, when in fact, it originated from another device.

BACKGROUND OF THE INVENTION

The keyboard has been the primary input device to the earliest personal computer systems, such as the early IBM Personal Computer. Personal computers have evolved quite a bit since those earlier days, but the keyboard still remains an integral part of the system.

The widespread acceptance of personal computers spurred the development of many new software application programs. These application programs provide some sort of service to a user or community of users. Many application programs are written to be interactive with the user. In most cases, this interaction between the user and the computer is done through a keyboard. The user can depress the keys on the keyboard to form a stream of input data or commands which is used by the application program. By data or commands it is intended that commands, while clearly data, are data specifically configured to cause the computer and/or application programs therein to operate on or transform in a specified manner other data. The application program usually takes action based on what data or commands the user typed in.

The interaction between keyboard user and computer is conventional and well known to those of ordinary skill in this art.

For purposes of this disclosure, typical systems which can be used to practice the invention include the IBM PS/2 line of personal computers, or compatibles. These systems have keyboard device drivers, where the user chooses to use the computer without a keyboard attached, and substitutes an alternate input device such as a handprint terminal, or the like to practice the invention.

It is important to appreciate that practice of the invention with an alternate input device does not preclude simultaneous use of a standard keyboard device because synchronization between the two types of devices is provided by the practice of the invention as is described hereinafter.

Conventional software applications, in most cases, rely on the operating system provided application programming interfaces (APIs) for keyboard input. Examples of such applications include spreadsheet programs, word processing programs, graphical drafting programs, etc. These APIs shield the application programs from the specifics of the actual keyboard hardware architecture and provide an easy mechanism for the user to interact with the computer. By using the operating system provided APIs, these application programs can be guaranteed to work across numerous hardware configurations as long as the operating system is the same on these different computer systems.

Typical of operating systems which provide such APIs are the IBM OS/2 and DOS operating systems. Examples of such APIs are described in the OS/2 Programmers Guide, pages 519–540, published 1988, and IBM Personal System/2 and Personal Computer BIOS Interface Technical Reference, Chapter 2, pages 104–110, published 1987, the contents of which are incorporated by reference herein.

Further examples of other operating systems having similar APIs and with which it is contemplated the present invention may be implemented include, in a non-limiting manner, AT&T's UNIX, IBM's AIX, Microsoft's XENIX, and APPLE's computer operating systems, including the Macintosh operating system.

As more sophisticated input devices are developed, the need for operating system provided keyboard emulation becomes apparent. For example, if a user of some computer system, with a unique input device, like the handprint terminal described in U.S. Pat. No. 4,562,304, issued to Ward and Nilssen, entitled "Apparatus and Method for Emulating Computer Keyboard Input with a Handprint Terminal", wants to use any of the interactive applications described above as if he were using a keyboard, he would have to provide operating system software that does the following:

A. Communicates with the handprint terminal hardware;

B. Translates the raw hardware generated data into a format recognizable to the application programs and the rest of the operating system;

C. Synchronize the data between multiple sessions of the multitasking operating system D. Communicate with the other software components that make up the operating system;

E. Communicate with application software programs, either directly or indirectly through another operating system component; and F. Route the keystroke data to the appropriate interface.

In some operating systems this is impossible to accomplish. To accomplish the above task in the commercially available IBM OS/2 version 1.2 operating system, for example, you have to write a specific device driver for the unique input device. Although the implementation of step "A" above can be achieved by someone of ordinary skill in the art, steps "B", "C", "D", "E", and "F" cannot be accomplished due to the fact that the interfaces required to perform each of these tasks are undocumented interfaces. Even if these interfaces were known, the changing nature of the inner workings of the operating system level code and interfaces would cause inevitable compatibility errors.

This invention overcomes these problems by providing, for example, in a system similar to that described in U.S. Pat. No. 4,562,304, that the output of the handprint terminal, e.g., at point 71 of FIG. 1 of U.S. Pat. No. 4,562,304, to be sent to an operating system provided keyboard emulation interface that sends the data to the rest of the operating system as if the data actually came from a physical keyboard. The operating system then routes this data to any application registered for keyboard input, in the format expected and known to those of ordinary skill in this art.

SUMMARY OF THE INVENTION

The present invention provides a solution to the above problem, illustrated, for example, in connection with U.S. Pat. No. 4,562,304. This invention provides an operating system interface for keyboard emulation. The interface in accordance with the invention is to be used in conjunction with another input device, e.g., handprint terminal, mouse, touch screen, light pen, track ball, etc., or a pure software system, to produce keyboard data that is sent to the operating system and down to application programs as if it actually came from a keyboard input device.

More generally, in accordance with the invention there is provided a computer system which includes processing means, typically having a central processing unit and memory associated therewith. Input and output devices, such as a hard drive or a floppy disk drive, are associated with the central processing unit in a conventional manner. In addition, a display is provided for displaying visual representations of transformations being effected on data by the processor through operation of an operating system resident in memory. First input means, such as a keyboard, provides input of operator commands and data, commands being distinguished from data as being selected forms of data to effect operation on or transformations of other data in the system by the processing means and input/output means through operation with the operating system. The memory is configured by device driver software stored therein for processing, through interaction with the processor, input commands and data from the keyboard, in a manner compatible with other data processed thereby. The invention also provides a second input device, not comprising a keyboard, and further provides that the memory is configured by a keyboard device driver emulation program for processing, through interaction with the processor, the input commands and data from the second input device. The input commands and data from the second input device are processed as if the commands and data from the second input device were transmitted by a keyboard, in a manner compatible with other data processed thereby.

With respect to the specifics of the second input device, it can be a handprint terminal, a software application, a light pen, a touch screen, or a track ball. Further, the keyboard device driver emulator is configured to process commands and data from the second input device independent of the kernel of the operating system, to and from the operating system, in a format wherein the commands and data appear as if generated by a keyboard.

In another aspect, the invention is directed to a method of operating a computer system with an input device which is not a keyboard. The invention includes the steps of receiving data and commands from the input device and transforming the data and commands to appear as if generated from a keyboard. The transformed data and commands are then transmitted to the computer system to operate thereon as if said data and commands had been generated from the keyboard input device.

BRIEF DESCRIPTION OF THE DRAWINGS

The invention is described in greater detail with reference to the figures attached, wherein.

DETAILED DISCUSSION OF THE INVENTION

Having briefly described the invention, the same will become better understood from the following detailed discussion made with reference to the drawings described above. In this description, IBM's OS/2 operating system is used as an example in which the invention is implemented. The features presented by this invention can be used in any other operating system as previously discussed as will be readily apparent to those of ordinary skill in the art.

The diagrams, flowcharts, and algorithms discussed illustrate what is contemplated to be the best mode to practice the invention. The invention, for purposes of this disclosure, is implemented in the 32-bit release of IBM's OS/2 operating system, which shipped with the commercially available Microsoft Software Development Kit, sold to developers for developing 32-bit software applications to run on the IBM 32-bit OS/2 operating system.

Figure 1:
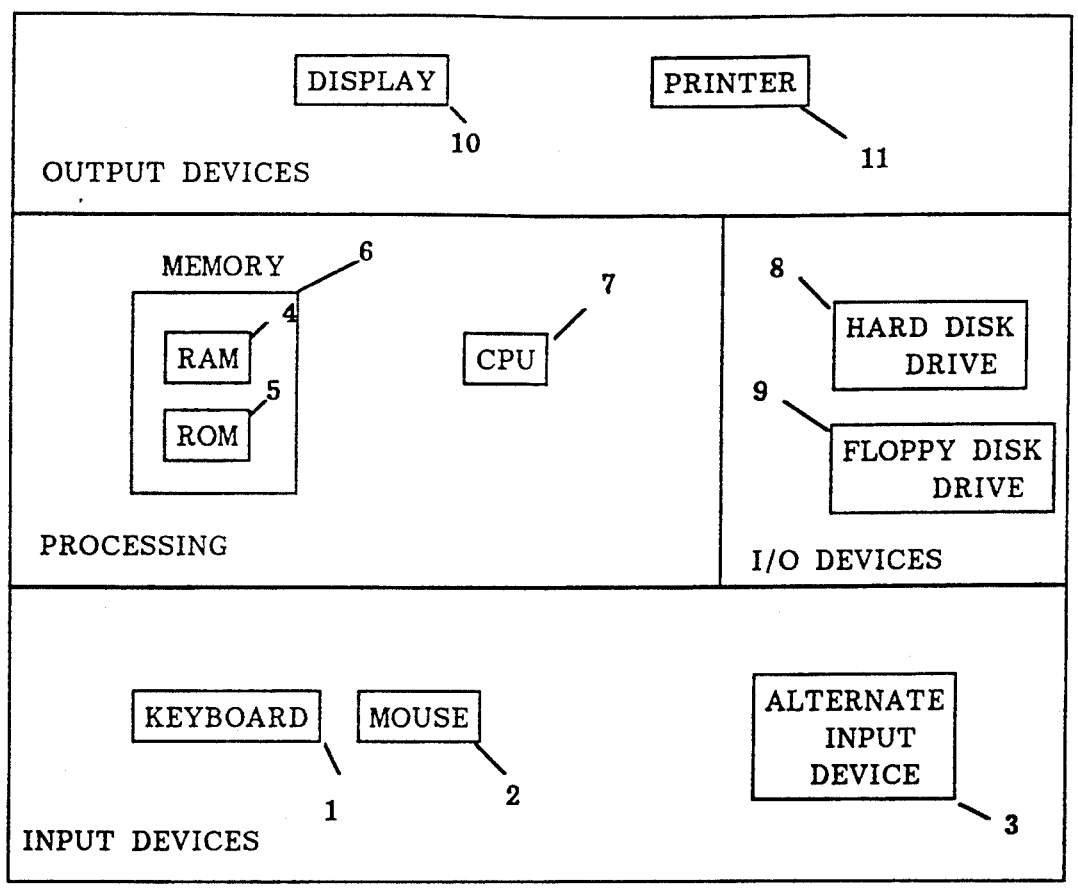
FIG. 1 is a block diagram, schematically illustrating the layout of a typical hardware configuration, e.g., a personal computer system, in which this invention can be practiced.

FIG. 1 illustrates a typical hardware configuration in which this invention can be practiced. The typical system used for this invention could be an IBM PS/2 Model 80 computer. Such a system typically includes a microprocessor 7, e.g., an Intel 80386 microprocessor, with a display 10, typically, an 8513 VGA display, memory 4, e.g., 2 Mb of random access memory (RAM), conventional and well known basic input and output services (BIOS) that reside in read only memory (ROM) 5, at least one fixed hard disk drive 8, and one floppy disk drive 9. The basic input output services (BIOS) is described in greater detail in the IBM Personal System/2 and Personal Computer BIOS Interface Technical Reference referred to previously and well known to those of ordinary skill in the art. The system might also include a printer 11, of any type, and an input device. Examples of input devices illustrated are a keyboard 1, a mouse 2, or an alternate input device 3. Examples of an alternate input device 3, are; handprint terminal, light pen, touch screen device, track ball, etc. The general operation of such a system and the interaction between components thereof is conventional and well known to those of ordinary skill in the art.

Figure 2:
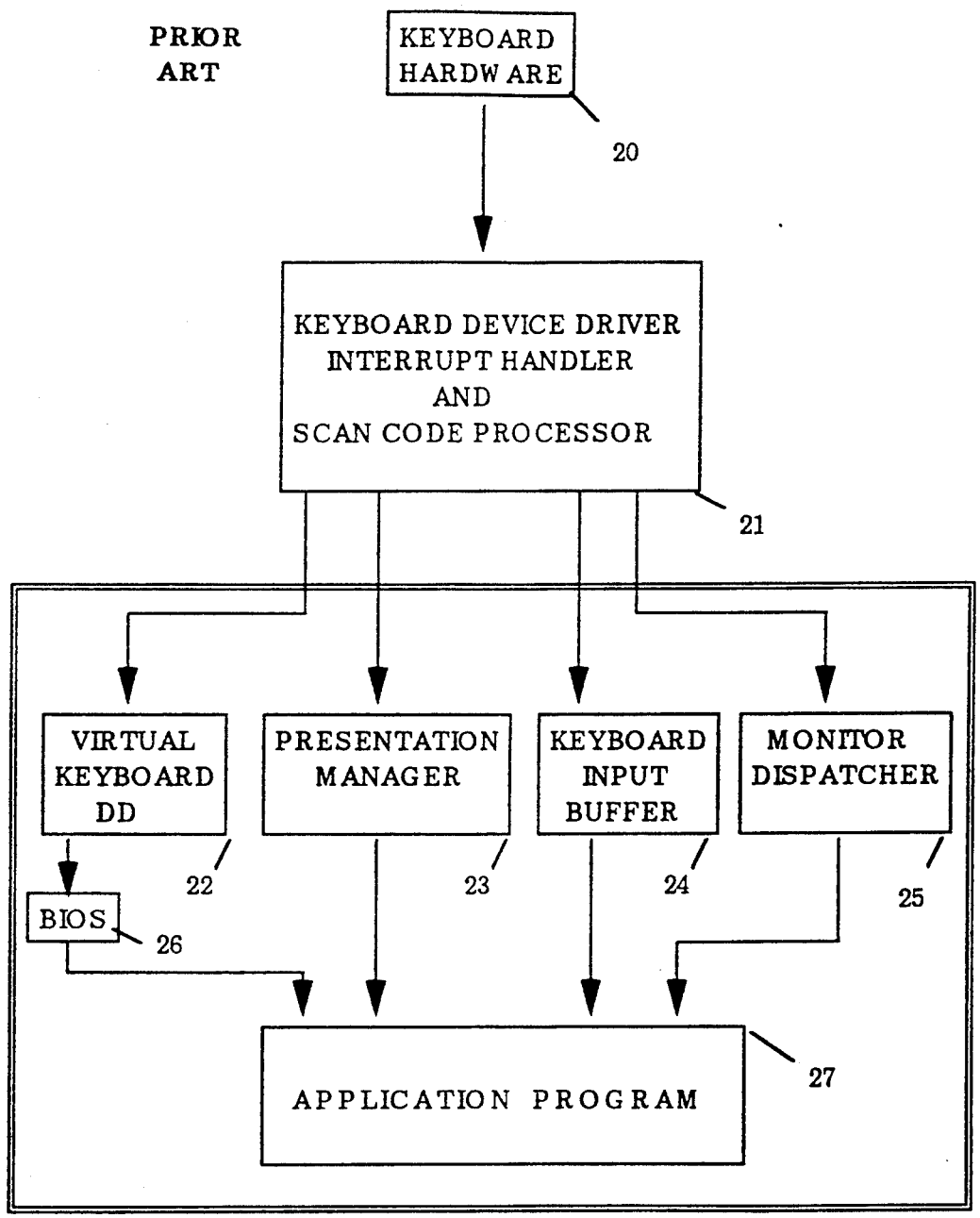
FIG. 2 is a block diagram illustrating keystroke data flow using an existing architecture which only allows for data flow originating from a keyboard device.

FIG. 2 displays the typical prior art architecture and path for keystroke data starting from the point when a key is pressed in a keyboard environment with a keyboard software device driver present. Such data is then processed by the operating system and transmitted to the application program for operation thereon in a conventional manner.

Since IBM's OS/2 operating system is a multitasking operating system, the final destination of keystroke data will vary, as it would in any multitasking operating system. The algorithms used for the determination of the destination for the keyboard data, use a session type value. A session type value is a number that is used by the operating system to identify the mode of operation that a process is running in. Typical session types in IBM's OS/2 running on an Intel 80386 processor are described below:

OS/2 fullscreen; The session is running in protected mode of an Intel 80386 microprocessor without the use of the presentation manager 23 shown in FIG. 2. The presentation manager 23, is a graphical user interface that controls input and visual output of the system and is known to those of ordinary skill in the art.

OS/2 window; The session is running in protected mode of an Intel 386 microprocessor with the use of the presentation manager 23.

DOS fullscreen; This session is running in virtual 8086 mode of an Intel 80386 microprocessor without the use of the presentation manager 23.

DOS window; This session is running in virtual 8086 mode of an Intel 80386 microprocessor with the use of the presentation manager 23.

Figure 3:
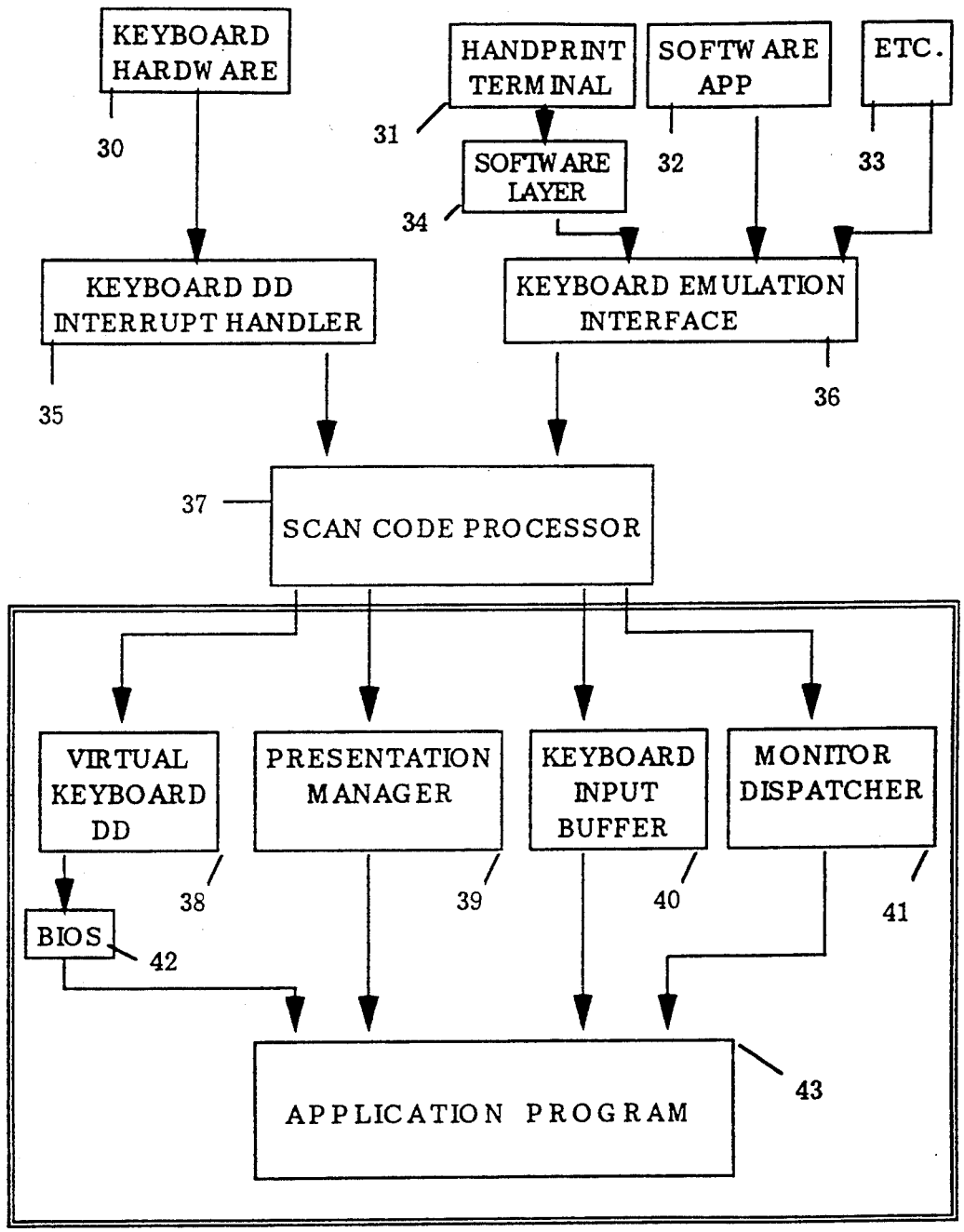
FIG. 3 is an example of how the architecture in the prior art, illustrated in FIG. 2, can use the keyboard emulation interface of the invention, to allow input from another means, such as a handprint terminal or pure software.

Greater details about the sessions and operation thereof may be found in the OS/2 Programmers Guide and in the literature provided with the commercially available Microsoft OS/2 32-bit Software Development Kit shipped in January of 1990, and a detailed understanding thereof is not necessary for the practice of the invention as will become more readily apparent herein. The path of the keystroke data, depending on the sessions, as shown in prior art FIG. 2, and in FIG. 3, are shown in both figures blocked off by a double solid line.

In the prior art, described with reference to FIG. 2, when the user hits a key on the physical keyboard 20, a hardware interrupt is generated. This is depicted by the arrow going from the keyboard hardware 20 to the keyboard device driver interrupt handler and scan code processor 21. The hardware interrupt generated by the keyboard hardware 20, is routed to the keyboard device driver interrupt handler and scan code processor 21. The keyboard device driver interrupt handler and scan code processor 21, is the part of the software keyboard device driver that gains control whenever a key is pressed. It then reads the keystroke data (scan code) and translates this scan code into a keyboard data record which is later passed on to an application program 27. An example of a keyboard data record is illustrated in the OS/2 Programmers Guide, on page 683.

Based on the foreground session type, where a foreground session type is the session type value of the currently executing process, the keystroke information is passed on to either the virtual keyboard device driver 22, the presentation manager 23, the keyboard input buffer 24, or the monitor dispatcher 25. The virtual keyboard device driver 22 is a software module responsible for communicating with all application processes running, e.g., in virtual 8086 mode of the Intel 80386 microprocessor. The monitor dispatcher 25, is a software module that is part of the operating system kernel, e.g., the OS/2 kernel. The monitor dispatcher 25 is responsible for communication with all application processes that obtain keyboard information through a character device monitor. A detailed discussion of character device monitors is also provided in the OS/2 Programmers Guide, on pages 230-236.

If the foreground session type is a virtual DOS fullscreen session as described in the Microsoft 32-bit OS/2 Software Development Kit documentation, then the keystroke information is passed to the virtual keyboard device driver 22. The virtual keyboard device driver 22 updates the BIOS buffer 26 with the ne keystroke information. Any applications that use the well known software Interrupt 16h services will then receive notification of this new keystroke information. A complete listing of the BIOS provided Interrupt 16h services is described in the IBM Personal System/2 and Personal Computer BIOS Interface Technical Reference, on pages 2-104 to 2-110.

If the foreground session is a virtual DOS window or an OS/2 Window then the keystroke information is passed to the presentation manager 23. The presentation manager 23 takes this keystroke information in the form of a keystroke data record, previously described, and packages it into a message format, e.g., as described in Programming the OS/2 Presentation Manager, chapter 8, published in 1989, the contents of which is incorporated by reference herein.

If the foreground session type is an OS/2 fullscreen session, a test is issued to check if the application program 27, running in the foreground session, is requesting the keyboard data indirectly, through the monitor dispatcher 25. If this is the case, the keystroke information is sent to the monitor dispatcher 25, in the form of a keystroke data record, previously described. The monitor dispatcher 25 then sends this keystroke information to the application program 27.

If the foreground session type is an OS/2 fullscreen session and it does not have any application processes requesting keystroke information indirectly, through the monitor dispatcher 25, then the keystroke information is sent to the keyboard input buffer 24. The keyboard input buffer 24, is a software first in first out (FIFO) queue, where keyboard data records are stored. If an application program 27, is registered for keyboard data updates, they then receive the keystroke information.

As can be appreciated from the above description, implementation of a system for emulating keyboards ordinarily needs to address very complicated software and hardware interactions. As shown in FIG. 3, in accordance with the invention, the prior art in FIG. 2 is improved to provide the keyboard emulation interface 36. The keyboard emulation interface 36, provides the ability for an alternate device, e.g., handprint terminal 31, or some pure software system 32 or other device 33 to send raw keyboard like data into an operating system without the need for actual keyboard hardware 30 to be present in the system.

The keyboard emulation interface 36, as will be more fully described, can be called from a software layer 34, that communicates with an alternate input device. The keyboard emulation interface 36 can also be used by a pure software system 32.

An example of a pure software system that can use this invention to provide keyboard emulation is an OS/2 Presentation Manager compatible software application that draws a graphical picture of a keyboard on the screen, similar to FIG. 14 in U.S. Pat. No. 4,899,136 issued to Beard et al, entitled "Data Processor having a User Interface Display with Metaphoric Objects". When the user places the mouse cursor over certain positions on the picture and clicks, the application translates the row/column position of the mouse pointer into a keyboard scan code. This can be as simple as a table lookup. The application 32 then calls the keyboard emulation interface 36 with the raw keyboard data and the keyboard emulation interface 36 handles this data as if it came from the actual keyboard hardware 30. All application programs 43 registered with the operating system for keyboard data updates will obtain this data in the exact same format as if it was generated from a keyboard 30.

Another example of a pure software system is an application program 32 that sends in a preset sequence of scan codes to perform some action at a certain time. The application 32 might be running as a background process, and at a certain time, it can "wake up" and send a sequence of scan codes to the keyboard emulation interface 36 that runs another program that may lock up the system.

FIG. 3 illustrates how a handprint terminal 31, or other substitute devices 33, can use this keyboard emulation interface 36 to fully emulate the keyboard 30. For example, the output of the handprint terminal 31, e.g., point 71 of U.S. Pat. No. 4,562,304, may be sent to a small software layer 34. This small software layer 34 simply reads the hardware generated data and transforms it into a corresponding keyboard scan code. This could be done with a simple data lookup table in a conventional manner and routinely used by those of ordinary skill in the art with knowledge of the interface 36 as described hereinafter. The software layer 34 then calls the keyboard emulation interface 36 with a defined data packet that includes the raw keyboard scan code and the destination session number.

Figure 4A:
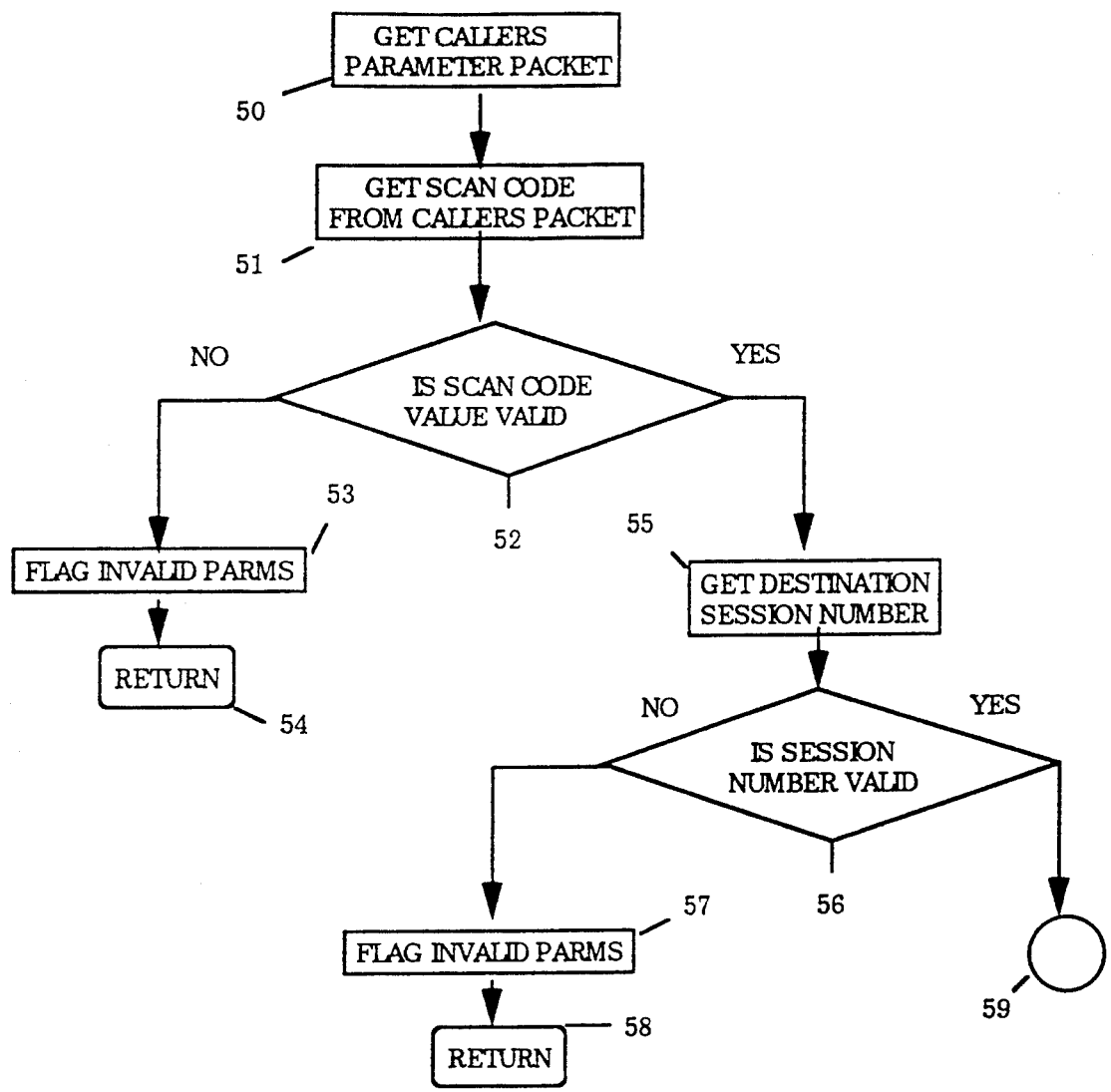
FIGS. 4A and 4B are a flowchart illustrating steps implementing the keyboard emulation interface of this invention.
Figure 4B:
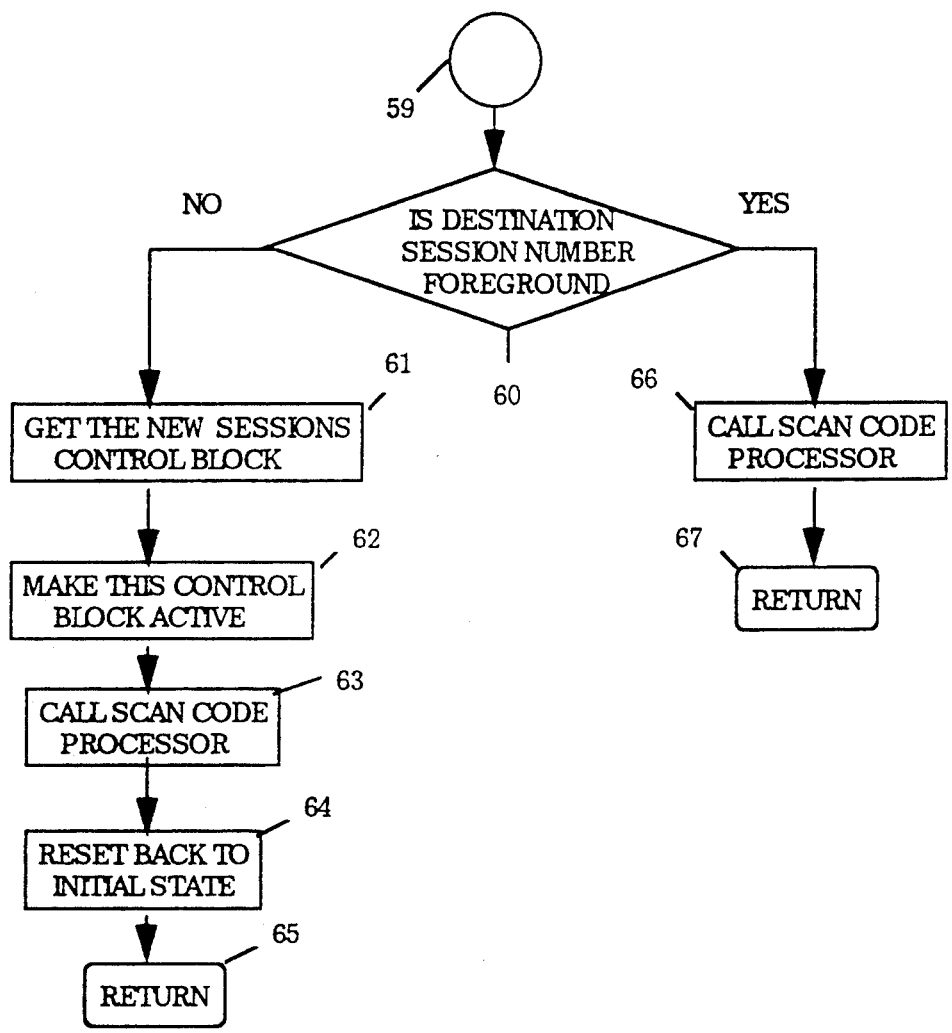

The invention is shown in greater detail in FIGS. 4a and 4b which illustrate a flowchart detailing the algorithm used within, and the operation of the keyboard emulation interface 36 shown in FIG. 3.

In FIG. 4a, software layer of 34 of FIG. 3, calls the keyboard emulation interface 36 with a parameter packet at step 50. Such parameter packets are well known to those of ordinary skill in the art and well documented in literature. A passed in scan code value is extracted from the packet at step 51. A check is made to see if the scan code is valid at decisional step 52, If the scan code is invalid it is flagged with an invalid parameter error at step 53 and control is returned to the caller at step 54 and the process is terminated or otherwise continued as controlled by software layer 34. If the scan code value is valid at step 52, the destination session number is extracted from the caller parameter packet at step 55. A check is made to determine if this session number is valid at decisional step 52. If the session number is invalid it is flagged with an invalid parameter(s) error at step 57 and control is returned to the caller step 58 as was previously discussed. If the session number is valid, flow continues from point point 59 in FIG. 4a to 59 in FIG. 4b.

A check is made to see if the destination session number is in the foreground at decisional step 60. If the session number is not in the foreground the destination sessions control block is obtained at step 61. There is a unique control block allocated for each session. The destination sessions control block is then made active at step 62 by updating the foreground session's control block pointer and updating the current session number value. The scan code processor is called at step 63. Upon return from the call to the scan code processor 63, the state is reset at step 64 to what it was initially, meaning that the real foreground session control block is made active and the current session number value is updated. Control is then returned to the caller at step 65 as previously described.

If the session number is in the foreground when the check is made at step 60, the scan code processor is called at step 66. Control is then returned to the caller step 67.

FIG. 3 illustrates how the keyboard emulation interface 36 passes control to the scan code processor 37. From this point on, everything encompassed in the double line box is identical to everything in the double line box of FIG. 2. The keyboard emulation interface 36 provides a solution that overcomes all previously described problems. It provides a seamless solution, building upon the existing prior art, depicted in the double line boxes of FIGS. 2 and 3, to provide full keyboard emulation to alternate input devices or pure software systems.

The net effect is that the application programs 43 will receive the new information in a keystroke format. The handprint terminal 31 now has the ability to fully emulate the keyboard by just providing the small software layer 34 as opposed to duplicating all the software from the scan code processor 37 and below.

While the invention has been illustrated in connection with a preferred embodiment, it should be understood that many variations will occur to those of ordinary skill in the art, and that the scope of the invention is defined only by the claims appended hereto in a non-limiting manner.

What is claimed is:

1. A data processing system comprising:
   a central processing unit;
   a memory, coupled to the central processing unit;
   an operating system, stored in said memory and executable on said central processing unit, said operating system capable of executing a plurality of tasks, each task having associated therewith a session number and a control block, said operating system further designating at least one of said tasks as being a foreground session;
   an input device, operatively coupled to the central processing unit and the memory by said operating system, said input device capable of generating a parameter packet, said parameter packets comprising at least one scan code and a destination session number;
   a scan code processor, responsive to said scan code of said parameter packet for processing said scan code; and
   a keyboard emulation interface, operatively coupled intermediate said input device and said scan code processor and responsive to said parameter packet generated by the input device, said keyboard emulation interface comprising,
   means for determining the validity of said scan code,
   means for determining the validity of said destination session number, and
   means for determining whether the destination session number is equal to the foreground session number.

2. The data processing system of claim 1 wherein said keyboard emulation interface further comprises means for activating the destination session control block.

3. The data processing system of claim 2 wherein said means for activating comprises means for changing a foreground session control block pointer to reference the destination session control block, and, means for changing the foreground session number to the destination session number.

4. The data processing system of claim 3 further comprising a keyboard device, operatively coupled to said scan code processor, said keyboard device capable of generating at least one scan code in response to manual manipulation thereof.

5. The data processing system of claim 4 further comprising a keyboard device driver operatively coupled intermediate said keyboard device and said scan code processor.

6. The data processing system of claim 1 wherein said input device comprises a handprint terminal.

7. The data processing system of claim 1 wherein said input device comprises an application program executing on said operating system as one of said plurality of tasks.

8. The data processing system of claim 1 wherein said input device comprises a light pen.

9. The data processing system of claim 1 wherein said input device comprises a touch screen.

10. The data processing system of claim 1 wherein said input device comprises a track ball.

11. In a data processing system having a scan code processor for processing keyboard scan codes, a non-keyboard, input device operatively coupled to the scan code processor, and an operating system executing plurality of sessions one of which is designated as a foreground session, a method of providing input commands and data from said input device to the operating system, said method comprising the steps of:

a) providing a keyboard emulation interface operatively coupled between said scan code processor and said input device; p1 b) receiving with said keyboard emulation interface, a parameter packet from said input device, said parameter packet comprising a scan code and a destination session number;

c) determining, with said keyboard emulation interface whether said scan code is valid;

d) determining, with said keyboard emulation interface whether said destination session number is valid;

e) determining, with said keyboard emulation interface, whether said destination session number is equal to the session number of said foreground session.

12. The method of claim 11 further comprising the step of:

f) supplying to the scan code processor said scan code, if the destination session number and the foreground session number are equal.

13. The method of claim 11 further comprising the step of:

g) activating the control block of the destination session if the foreground session number and the destination session number are not equal.

14. The method of claim 13 wherein the step of (g) comprises setting a foreground session control block pointer to reference the destination session control block, and, setting the foreground number equal to the destination session number.

* * * * *